United States Patent
Gimat et al.

(10) Patent No.: US 11,608,299 B2
(45) Date of Patent: Mar. 21, 2023

(54) METHOD FOR PRODUCING A HOLLOW PART MADE OF A CERAMIC MATRIX COMPOSITE MATERIAL

(71) Applicant: Safran Ceramics, Le Haillan (FR)

(72) Inventors: Matthieu Arnaud Gimat, Moissy-Cramayel (FR); Rémy Dupont, Moissy-Cramayel (FR); Maxime François Roger Carlin, Moissy-Cramayel (FR); Eric Philippe, Moissy-Cramayel (FR); Benjamin Lacombe, Moissy-Cramayel (FR)

(73) Assignee: Safran Ceramics, Le Haillan (FR)

( * ) Notice: Subject to any disclaimer, the term of this patent is extended or adjusted under 35 U.S.C. 154(b) by 382 days.

(21) Appl. No.: 16/652,481

(22) PCT Filed: Sep. 25, 2018

(86) PCT No.: PCT/FR2018/052347
§ 371 (c)(1),
(2) Date: Mar. 31, 2020

(87) PCT Pub. No.: WO2019/068987
PCT Pub. Date: Apr. 11, 2019

(65) Prior Publication Data
US 2020/0270180 A1   Aug. 27, 2020

(30) Foreign Application Priority Data

Oct. 2, 2017   (FR) ........................................ 1759189

(51) Int. Cl.
*C04B 35/565* (2006.01)
*C04B 35/628* (2006.01)
(Continued)

(52) U.S. Cl.
CPC ............ *C04B 35/565* (2013.01); *C04B 35/52* (2013.01); *C04B 35/584* (2013.01);
(Continued)

(58) Field of Classification Search
CPC ......................... C04B 35/64; C04B 35/62868
See application file for complete search history.

(56) References Cited

U.S. PATENT DOCUMENTS 4,041,123 A * 8/1977 Lange ...................... B22F 3/15
  419/49
4,889,686 A   12/1989 Singh et al.
(Continued)

FOREIGN PATENT DOCUMENTS

CN     1829670 A    9/2006
CN   103724042 A    4/2014
(Continued)

OTHER PUBLICATIONS

JP-H10232290, machine translation. (Year: 1998).*
(Continued)

*Primary Examiner* — Robert A Vetere
(74) *Attorney, Agent, or Firm* — Blank Rome LLP

(57) ABSTRACT

A method for producing a hollow part made of a ceramic matrix composite material. The method includes shaping a hollow fibrous preform. A core of oxidizable material is housed or inserted into the preform. The method also includes consolidating the preform and extracting the core by oxidising the core.

13 Claims, 2 Drawing Sheets

(51) Int. Cl.
*C04B 35/64* (2006.01)
*C04B 35/80* (2006.01)
*C04B 35/52* (2006.01)
*C04B 35/584* (2006.01)

(52) U.S. Cl.
CPC .. *C04B 35/62868* (2013.01); *C04B 35/62884* (2013.01); *C04B 35/62894* (2013.01); *C04B 35/64* (2013.01); *C04B 35/80* (2013.01); *C04B 2235/3826* (2013.01); *C04B 2235/5244* (2013.01); *C04B 2235/5256* (2013.01); *C04B 2235/6028* (2013.01); *C04B 2235/612* (2013.01); *C04B 2235/614* (2013.01); *C04B 2235/616* (2013.01); *C04B 2235/6583* (2013.01)

(56) References Cited

U.S. PATENT DOCUMENTS

| | | | |
|---|---|---|---|
| 4,994,904 | A | 2/1991 | Nakagawa et al. |
| 5,015,540 | A | 5/1991 | Borom et al. |
| 5,686,144 | A * | 11/1997 | Thebault ............... F16D 69/023 427/430.1 |
| 6,503,441 | B2 | 1/2003 | Corman et al. |
| 6,627,019 | B2 | 9/2003 | Jarmon et al. |
| 7,105,111 | B2 | 9/2006 | Bauer et al. |
| 2002/0005605 | A1 * | 1/2002 | Dunyak ............... B22C 1/02 425/467 |
| 2002/0180120 | A1 * | 12/2002 | Corman ............... C04B 35/563 264/643 |
| 2007/0199626 | A1 | 8/2007 | Diss et al. |
| 2009/0110877 | A1 | 4/2009 | Bernard et al. |
| 2009/0169873 | A1 | 7/2009 | Louchet-Pouillerie et al. |
| 2010/0003504 | A1 | 1/2010 | Louchet-Pouillerie et al. |
| 2011/0042863 | A1 | 2/2011 | Cavaliere |
| 2011/0121109 | A1 | 5/2011 | Charleux et al. |
| 2011/0293828 | A1 | 12/2011 | Eberling-Fux et al. |
| 2014/0048978 | A1 | 2/2014 | Taxacher et al. |
| 2015/0251959 | A1 * | 9/2015 | Goujard ............... C04B 35/80 427/255.12 |

FOREIGN PATENT DOCUMENTS

| | | |
|---|---|---|
| FR | 2 924 375 A1 | 6/2009 |
| FR | 2 995 892 A1 | 3/2014 |
| JP | H2-279304 A | 11/1990 |
| JP | H10-232290 A | 9/1998 |
| JP | H10232290 A * | 9/1998 |
| JP | 2003-192460 A | 7/2003 |
| JP | 2006-62943 A | 3/2006 |
| JP | 2010-216291 A | 9/2010 |
| JP | 2014-1723 A | 1/2014 |
| JP | 2016-13951 A | 1/2016 |
| RU | 2 429 212 C2 | 9/2011 |
| RU | 2 502 707 C2 | 12/2013 |
| WO | WO-92/10353 A1 | 6/1992 |
| WO | WO 2006/136755 A2 | 12/2006 |
| WO | WO 2010/063946 A1 | 6/2010 |
| WO | WO 2010/072978 A1 | 7/2010 |

OTHER PUBLICATIONS

P.M. Massagutov et al., "Catalyst Regeneration in Petroleum Processing and Petrochemistry", China Petrochemical Press, p. 25, 1992.

* cited by examiner

METHOD FOR PRODUCING A HOLLOW PART MADE OF A CERAMIC MATRIX COMPOSITE MATERIAL

CROSS-REFERENCES TO RELATED APPLICATIONS

This application is a national stage of International Application No. PCT/FR2018/052347, filed on Sep. 25, 2018, which claims the benefit of French Patent Application No. 1759189, filed Oct. 2, 2017, the contents of each of which are incorporated herein by reference.

FIELD OF THE INVENTION

The present invention relates to a method for producing a hollow part made of a ceramic matrix composite material or CMC.

A field of application of the invention is the manufacture of structural parts used in hot parts of a turbomachine, for example turbine parts, afterbody parts or secondary nozzles of the turbomachine. More precisely, the invention can be used for the manufacture of turbine nozzles or hollow blades.

BACKGROUND OF THE INVENTION

A turbine stage consists of a stationary or nozzle blading belonging to a stator, followed by a moving blading belonging to a rotor. The first stages of the nozzle are generally hollow to convey air radially from the outside to the inside of the turbine, to supply air to the hub for pressurization and bleed and possible cooling. Some of this air can be used to cool the nozzle.

The moving blades can also be hollow so that cooling air can flow through same. Using hollow parts also reduces the mass of the turbomachine.

A method for making hollow CMC parts is known from US document 2014/0048978. Such method includes the following steps:
placing a silicon core in a hollow area of a porous preform,
heating the core and the preform so as to melt the core, the silicon of said core infiltrating the porous preform so as to consolidate it.

Such a method has two main disadvantages.

The first disadvantage is related to the fact that the core and the mould (or former) are made of different materials. Indeed, the core, made of silicon, has a different thermal expansion from the mould, made of carbon or metal, which can induce variability in the finished part. Compensation is therefore necessary to ensure the correct fibre content and the correct dimensions of the part.

The second disadvantage is that the volume of the silicon core has to be correctly dimensioned so that the entire porous preform is infiltrated by the silicon of the core. In general, if there is an excess of silicon in the core, drainage means are provided to remove this excess from the cavity. Similarly, if the amount of silicon in the core is not sufficient to infiltrate the entire porous preform, a crucible must be provided to bring additional silicon into the cavity. This actually makes the preform infiltration stage more complex.

SUMMARY OF THE INVENTION

The invention aims to remedy such drawbacks in a simple, reliable and inexpensive way.

For this purpose, the invention provides a method for producing a hollow part made of a ceramic matrix composite material comprising the steps of:
shaping a hollow fibrous preform, a core made of an oxidizable material being housed or inserted into the preform;
consolidating said preform; and
extracting the core by oxidising said core.

In this way, the core can be easily removed with no risk of damaging the preform. Indeed, the latter having been consolidated prior to removing the core, said preform retains its dimensions and shape after removal of the core.

Oxidation means the chemical reaction of the core with an oxidant or oxidizing agent that converts it to an oxide. In addition, core removal by oxidation can easily be carried out within the scope of the current manufacturing of CMC parts, without the need for major adaptations of the manufacturing method.

To facilitate its removal, the core can be pierced through or can be cut-out.

The step of extracting the core by oxidation may include the sub-steps of:
heating the preform, in which the core is inserted, in a furnace under an oxidising atmosphere;
mechanically removing the oxidised core, e.g. by scraping.

This heating can be carried out in the presence of a catalyst, such as potassium acetate.

The presence of a catalyst reduces the duration of the heating step and facilitates core removal.

Said heating can be carried out at a temperature ranging from 400° C. to 800° C.

Such heating may include:
a first heating cycle lasting between 20 hrs and 30 hrs;
a second heating cycle lasting between 10 hrs and 15 hrs.

In general, the first and second heating cycles may vary depending on the volume of the core as well as the section of the core that is in direct contact with the air.

A mechanical core removal operation, such as a scraping operation, can be performed after each heating cycle.

The oxidizable core can be made of carbon, graphite or other material derived from carbon-.

Such materials are particularly resistant to the consolidation stage.

The hollow fibrous preform can be made by draping or assembling fibrous textures around the core, or by weaving a preform having a hollow area for insertion of the core.

Said consolidation of the preform may comprise the sub-steps consisting of:
creating at least one interphase, e.g. of boron nitride, on the fibres of the fibrous preform by chemical vapour infiltration;
creating at least one ceramic matrix layer, e.g. of silicon carbide, on the interphase by chemical vapour infiltration.

It is also possible to carry out the consolidation of the threads used to weave the hollow fibrous preform or to manufacture the fibrous textures, for example one-dimensional fabrics, assembled or draped around the core to make the hollow fibrous preform.

Said consolidation of the threads may comprise the sub-steps consisting of:
creating at least one interphase, e.g. of boron nitride, on the threads by chemical vapour infiltration;
creating at least one ceramic matrix layer, e.g. of silicon carbide, on the interphase by chemical vapour infiltration.

The hollow preform can then be shaped, with a core made of an oxidizable material being housed or inserted into the preform. The hollow fibrous preform can then be woven with these consolidated threads, or can result from assembling one-dimensional fabrics made from these consolidated threads around an oxidizable core.

The step of extracting the core by oxidation may be followed by a step of densification of the preform consisting at least in part of:
- the introduction of a metal powder, e.g. silicon powder, into the preform;
- the infiltration of molten metal, e.g. molten silicon into the preform.

The step of extracting the core by oxidation can be followed by the steps of:
- machining the part;
- covering the outer surface of the part with a coating forming a thermal or environmental barrier.

The invention will be better understood and other details, characteristics and advantages of the invention will appear when reading the following description, which is given as a non-limiting example, with reference to the attached drawings.

DETAILED DESCRIPTION

Figure 1:
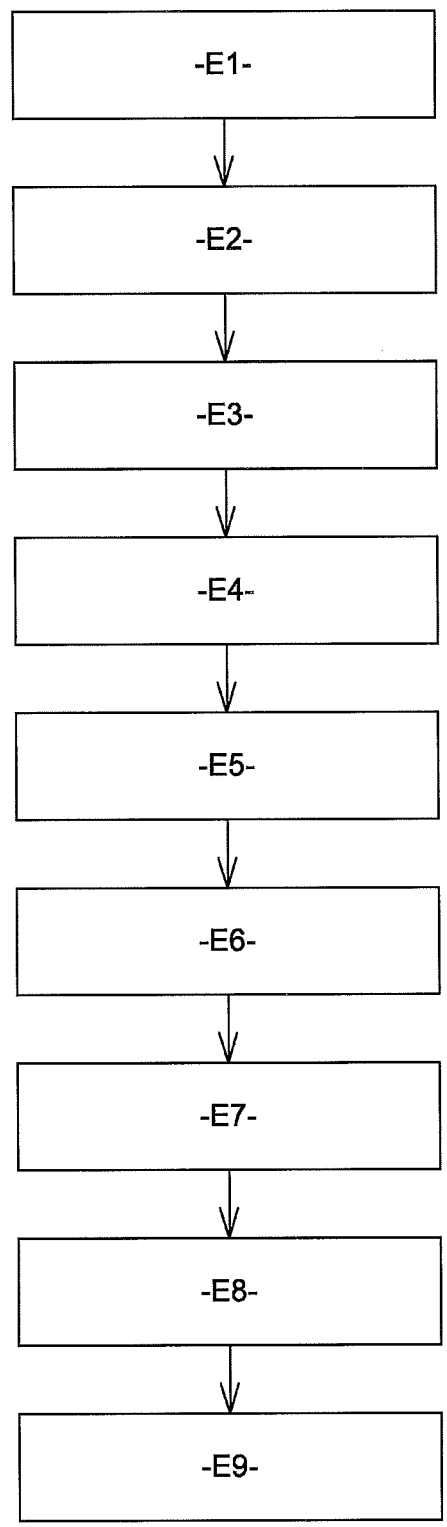
FIG. 1 is a diagram illustrating the various successive steps of the method according to the invention.

FIG. 1 schematically represents the various steps of a method for producing a hollow part made of a ceramic matrix composite (CMC) material according to one embodiment of the invention.

This method comprises a first step E1 in which a hollow fibrous preform is shaped, a core made of an oxidizable material being housed or inserted into the preform.

For example, the core is made of carbon, graphite or other materials derived from carbon.

The fibrous preform intended for forming the fibrous reinforcement of the part according to the invention can be obtained by multilayer weaving between a plurality of layers of warp threads and a plurality of layers of weft threads. The multilayer weaving produced can be in particular an "interlock" type weave, i.e. a weave in which each layer of weft threads binds several layers of warp threads with all the threads of the same weft column having the same movement in the plane of the weave.

Other types of multilayer weaving may of course be used.

When the fibrous preform is made by weaving, the weaving can be carried out with warp threads extending in the longitudinal direction of the preform, it being noted that weaving with weft threads in this direction is also possible.

In one exemplary embodiment, the threads used may be silicon carbide (SiC) threads supplied as "Nicalon", "Hi-Nicalon" or "Hi-Nicalon-S" by the Japanese company Nippon Carbon or "Tyranno SA3" by the company UBE and having a size (number of filaments) of 0.5K (500 filaments).

For turbomachine blades intended for use at high temperatures and especially in corrosive environments (e.g. wet environments), threads made of ceramic fibres, especially silicon carbide (SiC) fibres, can be used for weaving. For parts with a shorter service life, carbon fibres can also be used.

In particular, different modes of multilayer weaving are described in document WO 2006/136755.

Such a method makes it possible to produce a coherent preform comprising a hollow area in which the core is inserted.

The fibrous reinforcement of the part according to the invention can still be formed from a fibrous preform obtained by joining two fibrous textures. In this case, the two fibrous textures can be joined together, for example by sewing or needling, or simply juxtaposed. In particular, both fibre textures can be obtained from a single layer or a stack of several layers of:
one-dimensional (UD) fabric,
two-dimensional (2D) fabric,
braid,
knitting,
felt,
unidirectional ply of multidirectional threads or cables or plies obtained by superimposing several unidirectional plies in different directions and by bonding the unidirectional plies to each other, for example by sewing, chemical bonding agent or needling.

In the case of a stack of several layers, the layers are joined together, for example by sewing, layout of threads or rigid elements or by needling, or simply placed side by side.

As before, such a method makes it possible to produce a coherent preform comprising a hollow area in which the core is inserted.

Finally, the fibrous reinforcement of the part according to the invention can still be formed by draping unidirectional folds, fabrics or strips, around the core. In this case, the hollow area in the preform is created directly by constructing the preform around the core.

The assembly comprising the preform and the core inserted in the hollow area of the preform is then placed in a shaping tool (step E2) so as to maintain the preform in a shape close to that of the part to be manufactured.

Examples of the shaping of fibrous preforms from a coherent fibre structure can be found, for example, in the US patent application 2011/0293828.

A boron nitride (BN) interphase coating is then formed by Chemical Vapor Infiltration (CVI)—step E3, the preform being held in the desired shape by means of shaping tooling, said tooling being placed in a furnace. The tooling can be made of graphite and can include holes allowing the passage of the gas phase. This gas phase may include boron trichloride $BCl_3$, ammonia $NH_3$ and hydrogen gas $H_2$.

At the end of step E3, the preform and the core are still held in the forming tooling in the furnace, a ceramic matrix layer is formed by CVI on the BN interphase for consolidation of the preform (step E4), i.e. to bind the fibres of the preform sufficiently together so that the preform can retain its shape without the assistance of the forming tools. This matrix layer is for example made of silicon carbide SiC.

In steps E3 and E4, the preform and the core are subjected to a temperature between 700 and 1100° C.

Figure 2:
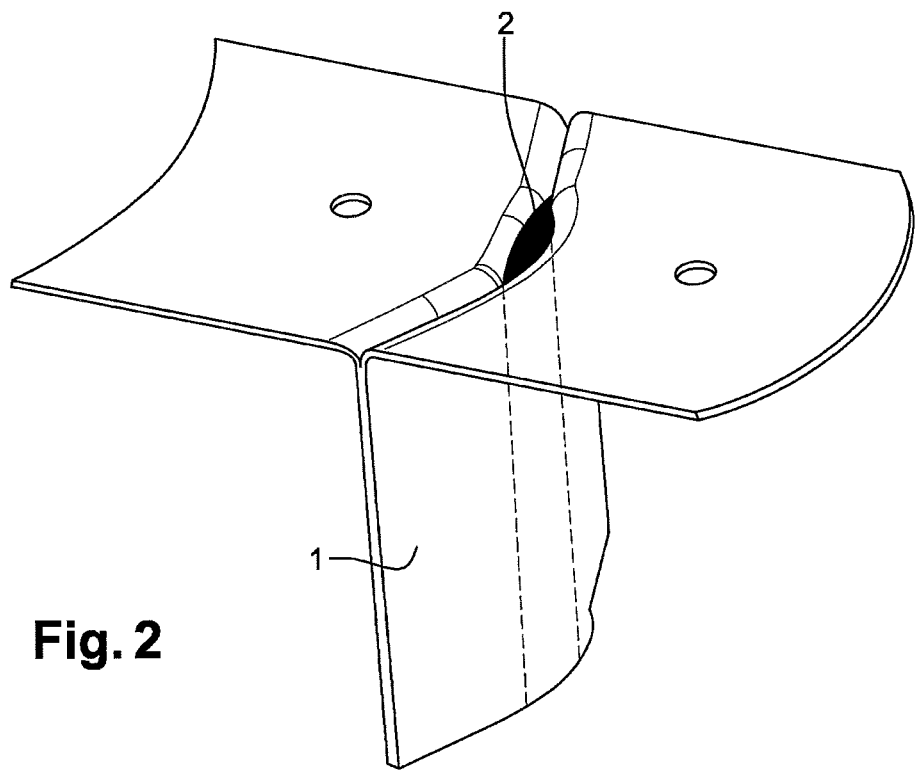
FIG. 2 is a schematic view of the preform in which the core is inserted.

The core 2 (visible in dotted lines in FIG. 2) and the preform 1 are then removed from the shaping mould and placed in a furnace under an oxidising atmosphere, i.e. in the presence of a catalyst, such as potassium acetate, to carry out the extraction of the core by oxidation (E5). Oxidation refers to the reaction of a body with oxygen, resulting in an oxide.

In this oxidation step E5, the core is removed by a chemical reaction that converts it into an oxide. For this purpose, the core and the preform undergo a first heating cycle during which the temperature in the furnace is maintained between 400° C. and 800° C., for example around 600° C., for a period between 20 and 30 hours, for example around 25 hours. Part of the core is then removed by mechanical action, for example by scraping. At the end of the first heating and scraping cycle, between 30 and 50% of the core mass can be removed.

Figure 3:
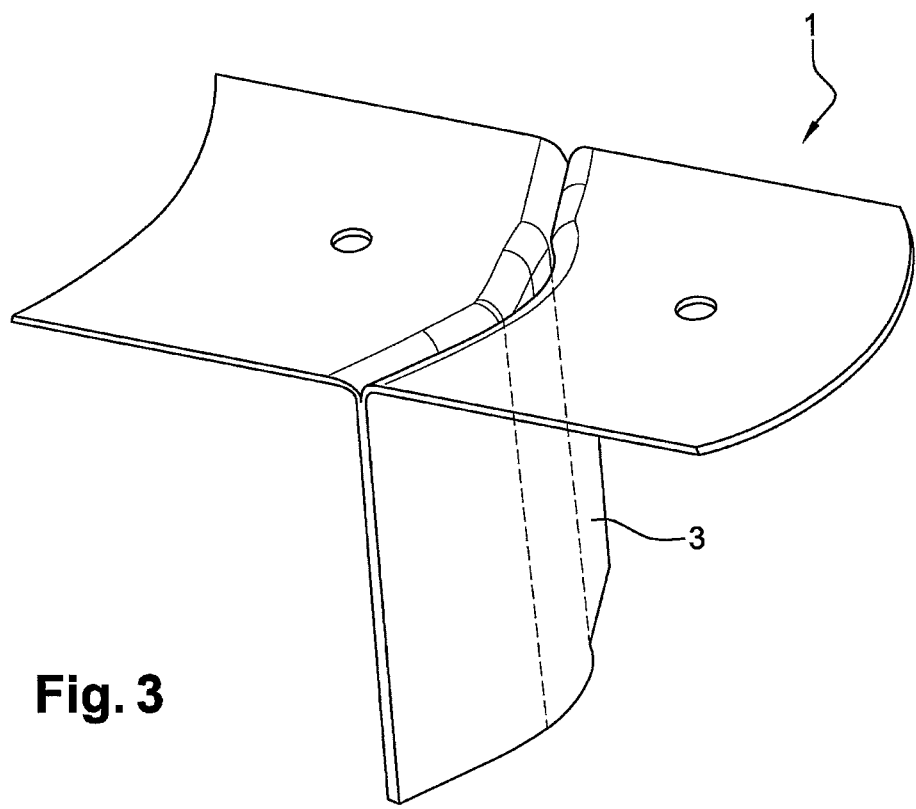
FIG. 3 is a schematic view of the preform after removal of the core by oxidation.

The core and the preform then undergo a second heating cycle in which the temperature in the furnace is maintained between 400° C. and 800° C., for example around 600° C., for a period between 10 and 15 hours, for example around 12 hours. The rest of the core is then removed by mechanical action, e.g. by scraping. At the end of the first heating and scraping cycle, substantially all of the core has been removed and a preform 1 having a hollow area 3 is obtained, said hollow area 3 being shown in dotted lines in FIG. 3.

A ceramic matrix is then formed in the preform by impregnating said preform with a slip containing one or more carbon or ceramic powder(s), e.g. SiC, $Si_3N_4$, C, B and mixtures thereof, in aqueous suspension, or SC ("Slurry Casting"—step E6). This densification step is carried out in a mould at room temperature. The preform is then removed from the mould and dried, then the forming of the ceramic matrix is continued in a furnace by infiltration with molten silicon or a molten alloy containing mostly silicon, or MI ("Melt Infiltration"—stage E7). The constituent(s) present within said molten silicon alloy may be selected from B, Al, Mo, Ti, and mixtures thereof. This densification step is carried out at a temperature between 1400° C. and 1450° C., for example.

An MI densification method is described in patents U.S. Pat. No. 4,889,686, 4,994,904 and 5,015,540.

The part obtained after step E7 is then removed from the furnace and functional surfaces are possibly machined (step E8), e.g. by milling.

A coating, forming an environmental and/or thermal barrier having a function of thermal protection and/or protection against corrosion in oxidizing and/or humid environments, is applied to the surface of the part (step E9). In particular, patent applications WO2010/063946, WO2010/072978, US2009/0169873 and US2010/003504 can be referred to.

The invention claimed is:

1. A method for producing a hollow part made of a ceramic matrix composite material comprising the steps of:
   shaping a hollow fibrous preform, a core made of an oxidizable material being housed or inserted into the preform;
   consolidating said preform; and
   extracting the core by oxidizing said core;
   wherein the step of extracting the core by oxidizing said core comprises the following sub-steps:
      heating the preform in which the core is inserted, in a furnace under an oxidizing atmosphere in a first heating cycle lasting between 20 hours and 30 hours;
      mechanically removing part of the oxidized core by scraping;
      heating the preform in the furnace under an oxidizing atmosphere in a second heating cycle lasting between 10 hours and 15 hours; and
      mechanically removing a rest of the oxidized core by scraping.

2. The method according to claim 1, wherein said heating is carried out in the presence of a catalyst.

3. The method according to claim 2, wherein the catalyst comprises potassium acetate.

4. The method according to claim 1, wherein said heating is carried out at a temperature ranging from 400° C. to 800° C.

5. The method according to claim 1, wherein the oxidizable core is made of carbon, graphite or other material derived from carbon.

6. The method according to claim 1, wherein the hollow fibrous preform is made by draping or assembling fibrous textures around the core, or by weaving a preform having a hollow area for insertion of the core.

7. The method according to claim 1, wherein said consolidation of the preform comprises the sub-steps of:
   creating at least one interphase on the fibres of the fibrous preform by chemical vapour infiltration; and
   creating at least one ceramic matrix layer on the interphase by chemical vapour infiltration.

8. The method according to claim 7, wherein the at least one interphase comprises boron nitride.

9. The method according to claim 7, wherein the at least one ceramic matrix layer comprises silicon carbide.

10. The method according to claim 1, wherein the step of extracting the core by oxidation is followed by a step of densification of the preform comprising:
    the introduction of a metal powder into the preform; and
    the infiltration of molten metal into the preform.

11. The method according to claim 10, wherein the metal power comprises a silicon powder.

12. The method according to claim 10, wherein the molten metal comprises a molten silicon.

13. The method according to claim 1, wherein the step of extracting the core by oxidation is followed by the steps of:
    machining the part; and
    covering the outer surface of the part with a coating forming a thermal or environmental barrier.

* * * * *